United States Patent
Miyata et al.

(10) Patent No.: US 7,420,910 B2
(45) Date of Patent: *Sep. 2, 2008

(54) OPTICAL RECORDING/REPRODUCING METHOD FOR MULTIPLE RECORDING MEDIA WITH DIFFERENT RECORDING DENSITY

(75) Inventors: Kazutomo Miyata, Miyagi (JP); Teruyuki Ota, Miyagi (JP); Makoto Watanabe, Miyagi (JP); Yoshihito Fukushima, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/526,392

(22) Filed: Sep. 25, 2006

(65) Prior Publication Data
US 2007/0019527 A1 Jan. 25, 2007

Related U.S. Application Data

(63) Continuation of application No. 10/503,265, filed as application No. PCT/JP03/01246 on Feb. 6, 2003, now Pat. No. 7,113,470.

(30) Foreign Application Priority Data
Feb. 6, 2002 (JP) ............................. 2002-030032

(51) Int. Cl.
*G11B 7/24* (2006.01)
(52) U.S. Cl. .................................... 369/275.4; 369/283
(58) Field of Classification Search ........................ None
See application file for complete search history.

(56) References Cited

U.S. PATENT DOCUMENTS

| 5,379,288 | A | 1/1995 | Maeda et al. |
| 5,723,227 | A | 3/1998 | Matsumoto et al. |
| 5,820,795 | A | 10/1998 | Takemori et al. |
| 6,653,057 | B1 | 11/2003 | Koyama |
| 6,999,395 | B2 | 2/2006 | Ando et al. |

(Continued)

FOREIGN PATENT DOCUMENTS

DE 19524865 1/1996

(Continued)

*Primary Examiner*—Paul Huber
(74) *Attorney, Agent, or Firm*—Robert J. Depke; Rockey, Depke & Lyons, LLC

(57) ABSTRACT

An optical recording and reproducing method is able to record and reproduce information by using an optical system using recording and reproducing light with a wavelength selected in a range of from 780 nm±10 nm and an objective lens with a numerical aperture NA selected in a range of from 0.45±0.01 and records and reproduces first and second optical recording mediums having different recording capacities. The first optical recording medium is constructed by using a substrate with a track pitch $Tp_1$ being selected in a range of from 1.5 μm to 1.7 μm and a groove depth $d_1$ being selected in a range of from 70 nm to 90 nm, and the second optical recording medium is constructed by using a substrate 11 with a track pitch $Tp_2$ being selected in a range of from 1.2 μm to 1.3 μm and a groove depth $d_2$ of the groove 12 being selected in a range of from 150 nm to 180 nm. This, the optical recording medium has compatibility with existing optical discs and has a recording density high enough to record a moving picture.

14 Claims, 6 Drawing Sheets

U.S. PATENT DOCUMENTS

| | | |
|---|---|---|
| 2001/0017256 A1 | 8/2001 | Shiratori |
| 2002/0009024 A1 | 1/2002 | Kumagai et al. |
| 2002/0027870 A1 | 3/2002 | Ikeya |

FOREIGN PATENT DOCUMENTS

| | | |
|---|---|---|
| EP | 0 596 716 | 5/1994 |
| EP | 0 777 216 | 6/1997 |
| EP | 1028414 | 8/2000 |
| EP | 1 256 947 | 11/2002 |
| JP | 01-143042 | 6/1989 |
| JP | 04-255946 | 9/1992 |
| JP | 04-271039 | 9/1992 |
| JP | 04-322530 | 11/1992 |
| JP | 05-012731 | 1/1993 |
| JP | 05-081717 | 4/1993 |
| JP | 06-208737 | 7/1994 |
| JP | 06-223421 | 8/1994 |
| JP | 06-290469 | 10/1994 |
| JP | 07-244877 | 9/1995 |
| JP | 08-007350 | 1/1996 |
| JP | 08-022621 | 1/1996 |
| JP | 08-031033 | 2/1996 |
| JP | 09-161321 | 6/1997 |
| JP | 09-251674 | 9/1997 |
| JP | 10-320780 | 12/1998 |
| JP | 11-120636 | 4/1999 |
| JP | 11-185308 | 7/1999 |
| JP | 11-195252 | 7/1999 |
| JP | 2000-021039 | 1/2000 |
| JP | 2000-132840 | 5/2000 |
| JP | 2000-173124 | 6/2000 |
| JP | 2000-195115 | 7/2000 |
| JP | 2000-231744 | 8/2000 |
| JP | 2001-243665 | 9/2001 |
| JP | 2001-325743 | 11/2001 |
| WO | WO 00/72319 | 11/2000 |
| WO | WO 01/59780 | 8/2001 | i: Overwrite Characteristic
j: Cross-Write Characteristic k: Groove
l: Land

OPTICAL RECORDING/REPRODUCING METHOD FOR MULTIPLE RECORDING MEDIA WITH DIFFERENT RECORDING DENSITY

The subject matter of application Ser. No. 10/503,265 is incorporated herein by reference. The present application is a continuation of 371 U.S. National Stage Application Ser. No. 10/503,265, filed Aug. 2, 2004, now U.S. Pat No. 7,113,470 claiming priority to PCT/JP03/01246 filed Feb. 6, 2003, which claims priority to Japanese Patent Application No. 2002-030032, filed Feb. 6, 2002. The present application claims priority to these previously filed applications.

TECHNICAL FIELD

The present invention relates to an optical recording and reproducing method that can be applied to a magneto-optical disc, widely used at present, such as an MD (Mini Disc), and particularly to an optical recording and reproducing method and an optical recording medium in which an optical system for use in recording and reproducing information has a wavelength selected in a range of from 780 nm±10 nm and an objective lens with a numerical aperture NA selected in a range of from 0.45±0.01.

BACKGROUND ART

As mediums for recording information such as music information, magneto-optical discs are widely used in the form of MDs, for example and are becoming very popular in Japan and foreign countries. Hence, the amount of information recorded on these magneto-optical discs is becoming very large. From a technological standpoint, on the background of the times in which the magneto-optical discs such as the MD have been put on the market at the beginning, an optical system for use with an apparatus for recording and reproducing a magneto-optical disc uses an LD (Laser Diode) having a wavelength of 780 nm as a light source and also uses an objective lens having a numerical aperture NA of 0.45.

Also, in the magneto-optical recording format such as the ISO, there have been proposed a method in which an information recording mark is recorded on a guide groove formed on the substrate of a magneto-optical recording medium, i.e. so-called groove and a method in which an information recording mark is recorded on a land formed between the grooves. In addition, Official Gazette of Japanese laid-open patent application No. 10-320780, etc. have proposed a method in which an information recording mark is recorded on both of a land and a groove. In the MD, information is recorded on the groove, and a distance between the grooves, that is, a track pitch Tp is selected to be approximately 1.6 μm.

It has been requested that such MD should be modified into the system capable of recording a moving picture and the like from an accessibility standpoint. The most important point of the points at which the system should be modified is to increase a recording density of a magneto-optical disc. While music information needs a recording density of approximately 100 MB, a moving picture requires a recording density of at least about 10 times as high as the above-mentioned recording density depending upon image quality. Although various methods have been so far proposed in order to achieve these requirements, one of such previously-proposed methods is a magnetically induced super resolution reproducing system, that is, a so-called MSR (Magnetically induced Super Resolution) system that is proposed in Japanese Patent No. 2805746, for example.

The MSR system will be described below in brief. According to this technology, a recording and reproducing film of a magneto-optical disk is comprised of a plurality of magnetic layers having proper coercive force, proper exchange-coupling force, a Curie temperature and the like, for example, a recording layer and a reproducing layer or an intermediate layer interposed between the recording layer and the reproducing layer. This technology uses the fact that a temperature produced on the recording and reproducing film on the magneto-optical disc with irradiation of reproducing laser light changes depending on the positions within the irradiated spot. Magnetization of the recording layer is transferred to the reproducing layer only in a certain limited temperature region. In the temperature region outside this temperature region, regardless of magnetizations of the recording layer, the magnetizations of the reproducing layer are arrayed in one direction, for example, to produce a magnetic mask on a part of the inside of a so-called irradiated spot. Thus, even when a plurality of marks is formed within the spot, it becomes possible to reproduce a part of the recording marks, thereby improving a resolution.

With respect to the above-mentioned MSR system, various systems have been proposed, which will be described below.

Official Gazette of Japanese laid-open patent application No. 1-143042 has proposed a so-called FAD (Front Aperture Detection) system which detects recording marks located ahead of the direction in which the irradiated spot is moved. According to the FAD system, a magneto-optical recording layer is composed of magnetic layers of a tri-layer structure comprising a reproducing layer made of GdFeCo or the like, an intermediate switching layer made of TeFeCoAl or the like and a recording layer made of TeFeCo or the like. When a laser spot is irradiated on a rotating disc-like medium, a high temperature region is slightly displaced rearwards from the center of the spot due to heat conductivity. In the high temperature region within this spot, since the temperature of the intermediate switching layer rises in excess of the Curie temperature, the exchange-coupling force between the reproducing layer and the recording layer decreases so that magnetizations of the reproducing layer selected to be the material with small coercive force are arrayed by reproduced magnetic fields and thereby information is erased, that is, masked. As a result, only the magnetizations of the recording marks of the front portion which is the low temperature region can be detected in the state in which they were transferred to the reproducing layer, and hence super resolution becomes possible.

Also, Official Gazette of Japanese laid-open patent application No. 5-81717, Official Gazette of Japanese laid-open patent application No. 5-12731 and the like, for example, have proposed a so-called CAD (Center Aperture Detection) system in which magnetization of a reproducing layer changes from surface magnetization to perpendicular magnetization only in the high temperature region at the central portion of the irradiation spot to read only recording marks from this portion.

Further, Official Gazette of Japanese laid-open patent application No. 3-90358, Official Gazette of Japanese laid-open patent application No. 4-271039 and the like, for example, have proposed a so-called RAD (Rear Aperture Detection) system for detecting rear recording marks of the spot.

On the other hand, Official Gazette of Japanese laid-open patent application No. 4-255946 and Official Gazette of Japanese laid-open patent application No. 4-271039 and the like, for example, have proposed a so-called D-RAD (Double mask Rear Aperture Detection) system in which a magneto-optical recording layer is composed of a recording layer, an intermediate layer and a reproducing layer. Upon reproduction, in the state in which the reproducing layer is magnetized in one direction, a reproducing magnetic field is applied to the reproducing layer along the magnetization direction to produce a low temperature region, a reproducible region and a high temperature region in the region irradiated with the illumination spot, a sum of the reproducing magnetic field and coercive force of the reproducing layer becomes small only in the reproducible region as compared with a magnetic field produced by a magnetic wall between the reproducing layer and the intermediate layer formed just under the reproducing layer, whereby the magnetization of the recording layer in this reproducible region is transferred to the reproducing layer to thereby reproduce information by a magnetically induced super resolution system.

An optical recording medium using this D-RAD system has already been commercially available on the market as an optical recording medium called "GIGAMO" (trade name and produced by Sony Corporation).

Further, Official Gazette of Japanese laid-open patent application NO. 6-290469 and the like, for example, have proposed a so-called DWDD (Domain Wall Displacement Detection) system in which a reproducing layer is made of a material of which domain wall coercive force is small and whose domain wall displacement degree is large as compared with those of a recording layer, a Curie temperature of an intermediate layer between the reproducing layer and the recording layer is selected to be small as compared with those of the reproducing layer and the recording layer and the magnetic domain of the reproducing layer is enlarged in the intermediate layer within the irradiated spot at its high temperature region of which temperature rises in excess of the Curie temperature to read out the magnetization of the recording layer.

Furthermore, Official Gazette of Japanese laid-open patent application No. 8-7350 and the like, for example, have proposed a so-called MAMMOS (Magnetic Amplifying MO System) system in which a magnetic domain of a recording layer is transferred to a reproducing layer by effectively utilizing an external magnetic field and in which the magnetic domain transferred to this reproducing layer is enlarged to read out the magnetization of the recording layer.

On the other hand, there are requests of effectively utilizing and keeping property such as information diffused on the whole world by magneto-optical discs such as the conventional MD, and the appearance of an apparatus or a method or a medium using this apparatus and method that can use moving pictures while the property of the above information can be used has been desired. That is, while keeping compatibility with the existing MD, the above medium is requested to increase only a recording density approximately 10 times.

It has been customary for the MD recording and reproducing apparatus to use the optical system using a light source with a wavelength selected to be 780 nm and an objective lens with a numerical aperture NA selected to be 0.45 as described above. Similarly to other optical discs, a shape of a focused beam spot is substantially determined by a wavelength of a light source and a numerical aperture of an objective lens.

After the shape of the beam spot is determined, the track pitch that can be used in that spot and the shortest pit length corresponding to a linear density are determined. In the case of the MD, the track pitch is substantially 1.6 µm, and the shortest bit length is 0.59 µm. The shortest bit length is determined by an MTF (Modulation Transfer Function: modulation transfer function) at the determined spot and the modulation-and-demodulation. With this bit length, when this optical system is used, it is possible to obtain a sufficient reproduced signal.

Also, a track pitch is selected in a range in which tracking can be achieved by the determined spot. Tracking uses a difference between reflectivities between the land and the groove, and not only the track pitch conditions but also the groove depth condition are added. A report entitled "The Main Point of Setting of Optical Pickup System" (compiled under the supervision of Mr. Noda, Electronics Essential Series No. 6, Japan Industry Engineering Center, 1984) has described the study that when a wavelength of light is $\lambda$ and a refractive index of a substrate is n, then a signal is lost if the groove depth is set to be $\lambda/4$ n.

Although the track pitch Tp and the shortest bit length are determined as described above, both of them should be decreased because of the demand of increasing a recording density. It is possible to decrease the track pitch to about 1.2 µm in a range in which a reproducing signal used to apply tracking can be held stably.

However, if the track pitch is reduced to 1.2 µm, then phenomenon in which upon reproduction, the adjacent track is affected by heat and information is recorded on the adjacent track, that is, so-called cross-write will occur unavoidably.

Although the cross-write is not a serious problem when a recording mark is not formed on the adjacent track, if information is recorded on the adjacent track, then such recorded information is broken, and hence the cross-write is a problem that should be prevented from a reliability standpoint.

It is an object of the present invention to provide an optical recording and reproducing method and an optical recording medium for use with the above optical recording and reproducing method in which the above-mentioned problems can be solved, which have compatibility with existing and most widely-used magneto-optical disc such as an MD, in which high density recording is possible, that is, a recording capacity is increased to make recording and reproduction of a moving picture become possible. Further, it is another object of the present invention to provide an optical recording and reproducing method and an optical recording medium for use with the above optical recording and reproducing method in which the occurrence of cross-write can be avoided and which is excellent in recording and reproducing characteristic.

DISCLOSURE OF THE INVENTION

According to the present invention, there is provided an optical recording and reproducing method for recording and reproducing information by an optical system using recording and reproducing light with a wavelength selected in a range of from 780 nm±10 nm and an objective lens with a numerical aperture NA selected in a range of from 0.45±0.01 and in which first and second optical recording mediums having different recording capacities are recorded and reproduced. The first optical recording medium is constructed by using a substrate with a track pitch selected in a range of from 1.5 µm to 1.7 µm and a groove depth selected in a range of from 70 nm to 90 nm, and the second optical recording medium is constructed by using a substrate with a track pitch selected in a range of from 1.2 µm to 1.3 µm and a groove depth selected in a range of from 150 nm to 180 nm.

Also, according to the present invention, in the above-mentioned optical recording and reproducing method, the shortest recording bit length of the second optical recording medium is selected to be less than a bit length corresponding to a cut-off frequency of a modulation transmission function of the optical system.

Further, according to the present invention, in the above-mentioned respective optical recording and reproducing methods, the first and second optical recording mediums are constructed as magneto-optical recording mediums.

Also, according to the present invention, in the above-mentioned respective optical recording and reproducing methods, the first optical recording medium has at least a first dielectric layer, a magneto-optical recording layer, a second dielectric layer and a thermal diffusion layer deposited on a substrate, in that order. The second optical recording medium has at least a first dielectric layer, a first magneto-optical recording layer, a second magneto-optical recording layer, a third magneto-optical recording layer and a second dielectric layer deposited on a substrate, in that order. A Curie temperature of the second magneto-optical recording layer is selected to be small as compared with those of the first and third magneto-optical recording layers.

Further, according to the present invention, in the above-mentioned respective optical recording and reproducing methods, the magneto-optical recording layer of the first optical recording medium is made of TbFeCo or TbFeCoCr, the first magneto-optical recording layer of the second optical recording medium is made of any one of GdFeCo, GdFe, GdFeCoCr, GdFeCoAl or GdFeCoSi, the second magneto-optical recording layer of the second optical recording medium is made of any one of TbFe, TbFeCo, TbFeAl, TbFeCr, TbFeSi, TbFeCoAl, TbFeCoCr or TbFeCoSi. The third magneto-optical recording layer of the second optical recording medium is made of either TbFeCo or TbFeCoCr.

Also, according to the present invention, in the above-mentioned respective optical recording and reproducing methods, the second optical recording medium is constructed as the magneto-optical recording medium in which information is reproduced by a magnetically induced super resolution system and which has a recording capacity greater than 1 GB.

Further, according to the present invention, in the above-mentioned respective optical recording and reproducing methods, the second optical recording medium is constructed as the magneto-optical recording medium in which information is recorded by a groove recording system.

Furthermore, according to the present invention, in the above-mentioned respective optical recording and reproducing methods, the second optical recording medium is constructed as the magneto-optical recording medium in which information is recorded by a land-groove recording system.

Also, the optical recording medium according to the present invention is an optical recording medium that is recorded and reproduced by an optical system using recording and reproducing light with a wavelength selected in a range of from 780 nm±10 nm and an objective lens with a numerical aperture NA selected in a range of from 0.45±0.01 and the optical recording medium is constructed by using a substrate with a track pitch selected in a range of from 1.2 µm to 1.3 µm and a groove depth selected in a range of from 150 nm to 180 nm.

Further, according to the present invention, in the above-mentioned optical recording medium, the shortest recording bit length of recording information is selected to be less than a bit length corresponding to a cut-off frequency of a modulation transmission function of the above-described optical system.

Also, according to the present invention, the above-mentioned optical recording medium is constructed as a magneto-optical recording medium.

Furthermore, according to the present invention, the above-mentioned optical recording medium has at least a first dielectric layer, a first magneto-optical recording layer, a second magneto-optical recording layer, a third magneto-optical recording layer and a second dielectric layer deposited on a substrate, in that order, and a Curie temperature of the second magneto-optical recording layer is selected to be small as compared with those of the first and third magneto-optical recording layers.

Also, according to the present invention, the first magneto-optical recording layer of the above-mentioned optical recording medium is made of any one of GdFeCo, GdFe, GdFeCoCr, GdFeCoAl or GdFeCoSi, the second magneto-optical recording layer is made of any one of TbFe, TbFeCo, TbFeAl, TbFeCr, TbFeSi, TbFeCoAl, TbFeCoCr or TbFeCoSi and the third magneto-optical recording layer is made of either TbFeCo or TbFeCoCr.

Further, according to the present invention, the above-mentioned optical recording medium is constructed as a magneto-optical recording medium in which information is reproduced by a magnetically induced super resolution system and which has a recording capacity greater than 1 GB.

Also, according to the present invention, the above-mentioned optical recording medium is constructed as a magneto-optical recording medium in which information is recorded by a groove recording system.

Furthermore, according to the present invention, the above-mentioned optical recording medium is constructed as a magneto-optical recording medium in which information is recorded by a land-groove recording system.

As described above, according to the present invention, information is recorded and reproduced by the optical system using the recording and reproducing light with the wavelength selected in a range of from 780 nm±10 nm and the objective lens with the numerical aperture NA selected in a range of from 0.45±0.01 similarly to the optical system in the conventional MD recording and reproducing system, the existing optical recording medium, which is widely used, such as the so-called MD in which the first optical recording medium is constructed by using the substrate with the track pitch selected in a range of from 1.5 µm to 1.7 µm and the groove depth selected in a range of from 70 nm to 90 nm can be recorded and reproduced, that is, the present invention has compatibility with other suitable recording and reproducing mediums such as the MD. At the same time, the optical recording medium constructed by using the second optical recording medium having a recording capacity different from that of the first recording medium, that is, the substrate with the track pitch selected in a range of from 1.2 µm to 1.3 µm and the groove depth selected in a range of from 150 nm to 180 nm also can be recorded and reproduced, and hence it becomes possible to record and reproduce next-generation optical recording mediums, which can be increased in recording density, by the recording and reproducing apparatus having the same optical system.

Further, since the groove depth of the optical recording medium in which the track pitch was reduced to approximately 1.2 µm to 1.3 µm in order to increase a recording density is selected in a range of from 150 nm to 180 nm as described above, the occurrence of the cross-write can be suppressed while the reproducing signal for applying tracking when the optical recording medium is recorded and reproduced can be held stably, and hence a recording and reproducing characteristic could be held satisfactorily.

Accordingly, by using the optical recording medium that can stably be recorded and reproduced by the compatible recording and reproducing apparatus, it becomes possible to use conventional information widely and at the same time, moving picture information and the like, which requires a large capacity, can be recorded and reproduced. Hence, it is possible to provide the optical recording and reproducing method and the optical recording medium which are extremely useful in actual practice.

BEST MODE FOR CARRYING OUT THE INVENTION

An optical recording and reproducing method and an optical recording medium for use with this optical recording and reproducing method will be described below with reference to the drawings. While the MD is applied to the first optical recording medium and the MSR system FAD and D-RAD system magneto-optical recording medium are applied to the second optical recording medium in the following examples, the present invention is not limited to these respective examples. For example, an optical recording medium using a pigment material layer as a recording layer may be used as the first optical recording medium or an optical recording medium based on the MSR system such as the CAD system and the RAD system may be used as the second optical recording medium.

Figure 1:
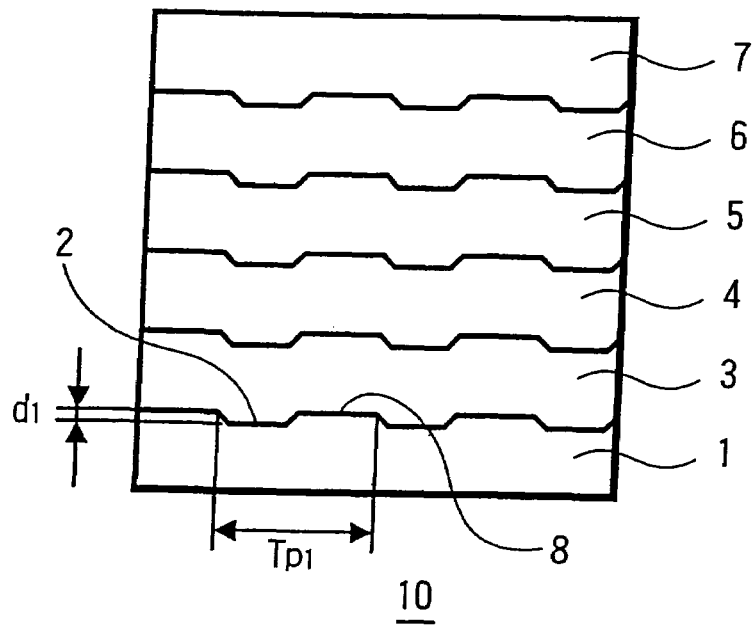
FIG. 1 is a schematic diagram showing an arrangement of an example of an optical recording medium.
Figure 2:
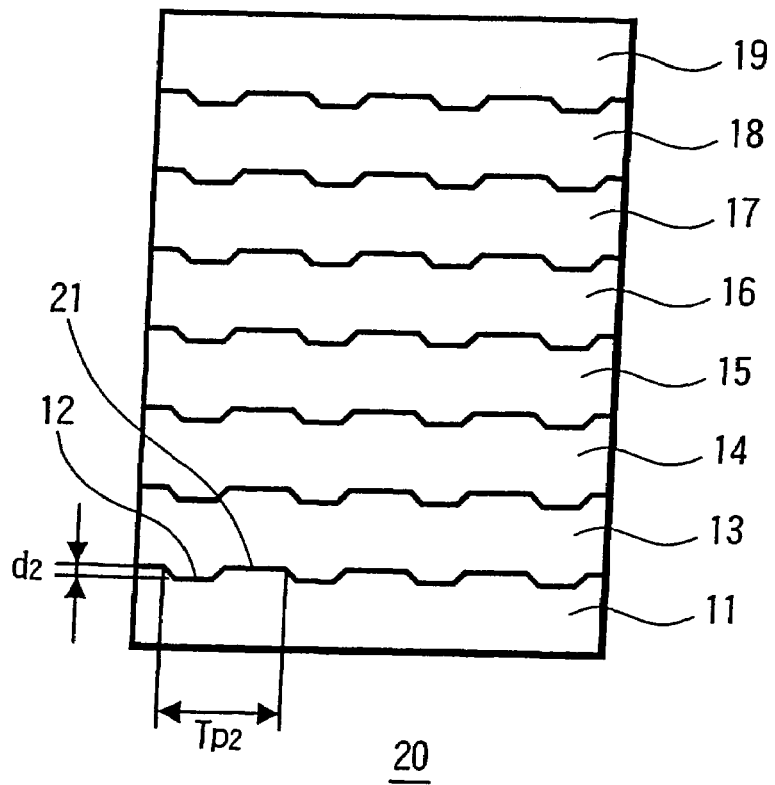
FIG. 2 is a schematic diagram showing an arrangement of an example of an optical recording medium.

FIGS. 1 and 2 are schematic diagrams showing an arrangement of an example of a first optical recording medium for use with an optical recording and reproducing method of the present invention. In FIG. 1, reference numeral 1 denotes a substrate on which a first dielectric layer 3, a magneto-optical recording layer 4, a second dielectric layer 5 and a thermal diffusion layer 6 are deposited, in that order, by a physical film deposition method such as a sputtering method. On the thermal diffusion layer, there is deposited a protective film 7 by a suitable method such as a spin-coating method and thereby a first optical recording medium 10 is constructed.

Also, as shown in FIG. 2, on a substrate 11, there are deposited a first dielectric layer 13, a reproducing layer 14, that is, a first magneto-optical recording layer, an intermediate switching layer 15, that is, a second magneto-optical recording layer, a recording layer 16, that is, a third magneto-optical recording layer, a second dielectric layer 17 and a thermal diffusion layer 18 by a physical film deposition method such as a sputtering method, in that order. On the thermal diffusion layer, there is deposited a protective layer 19 by a suitable method such as a spin-coating method and thereby a second optical recording medium 20 is constructed.

The substrates 1 and 11 are molded as disc-like substrates made of a resin material such as ZEONEX and polycarbonate by a suitable method such as an injection molding method. Refractive indexes of these substrates can be selected in a range of from 1.45 to 1.65, thicknesses thereof can be selected in a range of from 1.1 to 1.3 mm and birefringence thereof can be selected to be approximately 100 nm.

It is customary that the first dielectric layers 3 and 13 of the respective mediums 10 and 20 are made of SiN, $SiO_2$ and refractive indexes thereof are approximately 2.0.

The magneto-optical recording layer 4 of the first optical recording medium is made of TbFeCo, TbFeCoCr and the like, for example, and has a film thickness of about 20 nm, for example.

The reproducing layer 14 of the second optical recording medium 20 is made of a material having a large Kerr rotation angle, such as $Gd_{22}$ ($FeCo_{20}$) with superiority of a transition metal in order to enhance a reproducing signal, a Curie temperature thereof is set to be greater than 300° C., for example, 320° C. and a film thickness thereof is selected to be approximately 30 nm, for example. GdFeCo may contain an additive such Cr, as Al, Si, and this reproducing layer can also be made of GdFe.

The intermediate switching layer 15 of the second optical recording medium 20 may be made of $Tb_{20}(FeCo_2)_{77}Al_{13}$, a Curie temperature Tc thereof is selected to be lower than any one of Curie temperatures of the reproducing layer 14 and the recording layer 16, for example, 140° C. Al, Si, Cr and the like may be added as the additives and TbFe, TbFeAl, TbFeCr, TbFeSi may be used sometimes. A film thickness of this intermediate switching layer is selected to be 10 nm, for example.

The recording layer 16 of the second optical recording medium 20 may be made of $Tb_{20}$ ($FeCo_{25}$) such as $Tb_{20}$ ($FeCo_{25}$), $Tb_{20}$ ($FeCo_{25})_{78.5}Cr_{1.5}$ and a film thickness thereof is selected to be 20 nm, for example. A Curie temperature of this recording layer is 270° C. and a coercive force thereof at room temperature is 1.6 MA/m.

The second dielectric layers 5 and 17 of the first and second optical recording mediums 10 and 20 are made of a suitable material such as SiN or $SiO_2$ similarly to the first dielectric layer. These layers are provided not only in order to enhance a reproducing signal but also in order to prevent moisture from reaching the recording layer.

Further, the thermal diffusion layers 6 and 18 of the two mediums are formed by depositions of metals such as Al and AlTi. These layers are provided not only in order to make optical multiplex reflection but also in order to make thermal adjustment to enable recording marks of a desired size to be formed stably.

The protective layers 7 and 19 are made of an ultraviolet-curing resin, for example, and have film thicknesses ranging from approximately 10 to 20 μm. The protective layers 7 and 19 are provided not only in order to prevent moisture from entering the mediums but also in order to enable a magnetic head to move slidably with ease and also to prevent the recording layer from being damaged by mechanical scratches produced by the slidable movement of the magnetic head. If the protective layers are too thin, then they will become fragile. If they are too thick, then they will become heavy, and hence their film thicknesses are controlled so as to fall within a proper range of film thickness.

Then, grooves 2 are formed on the substrate 1 of the first optical recording medium 10 concentrically or spirally. A track pitch $Tp_1$ of the grooves 2 is selected in a range of from 1.5 µm to 1.7 µm for example, approximately 1.6 µm, and a depth $d_1$ thereof is selected in a range of from 70 to 90 nm, for example, approximately 70 nm. An address signal for use in storing information is recorded on the optical recording medium by wobbling by which the grooves are wobbled. In FIG. 1, reference numeral 8 denotes a land.

Grooves 12 are formed on the substrate 11 of the second optical recording medium 20 in such a manner that a track pitch $Tp_2$ thereof is selected in a range of from 1.2 to 1.3 µm, for example, approximately 1.3 µm and that a depth $d_2$ thereof is selected in a range of from 150 to 180 nm, for example, 170 nm. Reference numeral 21 denotes a land.

The reason that the track pitch $Tp_2$ of the second optical recording medium 20 is selected in a range of from 1.2 to 1.3 µm is to increase a recording density. Also, the above reason lies in the fact that, if this track pitch is less than 1.2 µm, then tracking cannot be achieved in an optical system in which a wavelength λ is 780 nm, a numerical aperture NA being 0.45. Further, the above reason lies in the fact that, if the above track pitch exceeds 1.3 µm, then it becomes difficult to increase a recording density.

The second optical recording medium 20 was recorded and reproduced in an FAD system by using an optical system with a light source having a wavelength of 780 nm and an objective lens having a numerical aperture NA of 0.45 and a change of a reproducing characteristic relative to the groove depth was measured.

More specifically, according to the above-mentioned arrangement, in the first magneto-optical recording layer of the second optical recording medium 20, that is, the reproducing layer 14, since the temperature of the intermediate switching layer 15 is raised in excess of the Curie temperature in the high temperature region within the spot irradiated with recording and reproducing light from the light source, exchange-coupling force between the reproducing layer 14 and the recording layer 15 is substantially reduced to zero and magnetizations of the reproducing layer 14 selected by the material with the small coercive force are arrayed by the reproducing magnetic field and thereby information is erased, that is, masked. As a result, the change of the reproducing characteristic can be detected in the state in which only the magnetizations of the recording marks of the front portion which is the low temperature region are transferred to the reproducing layer.

In this example, the reproducing layer 14 of the second optical recording medium 20 is the transition metal superiority film, the coercive force thereof is held at 8 kA/m at room temperature, and the Curie temperature thereof is set to be 320° C. as described above. The intermediate switching layer 15 is the transition metal superiority film and the Curie temperature thereof is set to be 140° C. as described above.

In this example, the second optical recording medium 20 was constructed in such a manner that the shortest recording bit length of recording information was selected to be 0.24 µm which is less than the bit length corresponding to the cut-off frequency of the modulation transmission function of the optical system, the recording capacity thereof was being selected to be 670 MB.

Figure 3:
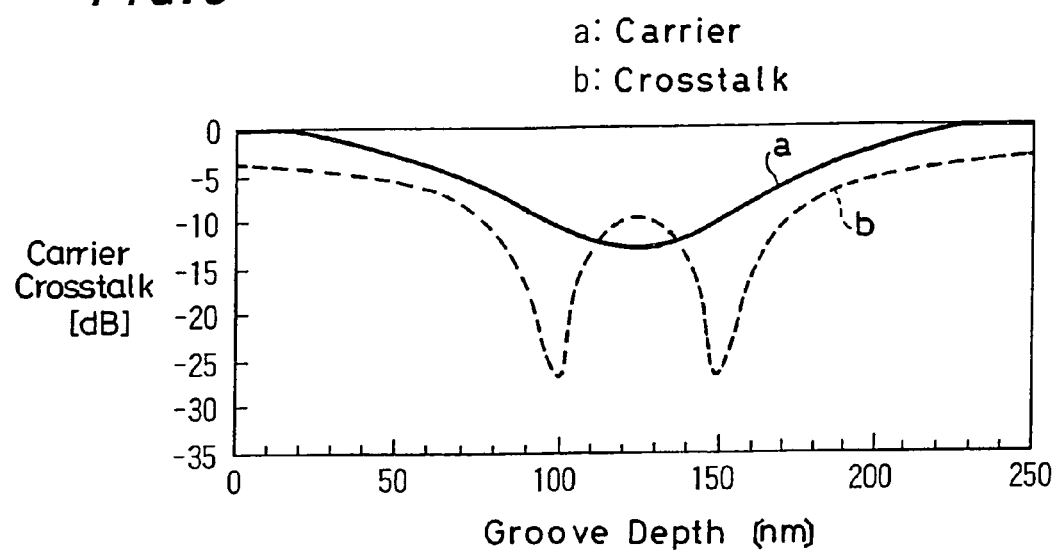
FIG. 3 is a diagram showing carrier and crosstalk characteristics relative to a groove depth of an example of an optical recording medium.

FIG. 3 shows changes of carriers of a recorded and reproduced groove (main track) relative to the depth of the groove on the substrate 11 of the second optical recording medium 20 and relative outputs of a leakage signal from the adjacent track (land), that is, crosstalk. In FIG. 3, a solid line a shows a carrier, and a solid line b shows a crosstalk.

A crosstalk appears not in the recording mode but only in the reproducing mode and cannot be canceled out completely regardless of the depth of the groove unlike the aforementioned cross-write. However, a study of the results on FIG. 3 reveals that a crosstalk signal has a certain tendency relative to the groove depth. More specifically, it is to be understood that, in the case of a certain groove depth, that is, about 100 nm and about 140 nm, the minimal value of the crosstalk appears. In the region in which the crosstalk is small, reproduction becomes easy, and a reproducing characteristic can be improved.

On the other hand, a signal from the main track becomes small in the groove depth of a certain range. From the results shown in FIG. 3, it is to be understood that the output becomes the minimum value when the groove depth lies in a range of from approximately 120 to 130 nm.

It is to be expected that a reproduced signal can be obtained in the region in which these characteristics are added together. If the carrier from the main track is large, then a reproduced signal can be used even though the crosstalk is large a little. Therefore, its evaluation index cannot be obtained from the simple comparison of the relative outputs, and from the results of the experiments done by the inventors of the present application, it was to be understood that a small groove depth region of 70 to 90 nm, more preferably, a small groove depth region of about 70 nm, a small groove depth region of 150 to 180 nm, more preferably, a small groove depth region of 160 to 175 nm can be used satisfactorily.

Having considered the characteristics of the carrier and the crosstalk, it is to be expected that larger groove depth regions which can be used in actual practice will exist intermittently. However, since grooves deeper than the above groove depths are difficult to be produced by the existing technologies such as the injection molding, it is desired that the groove depth should be less than 180 nm.

Also, while a region to record information may be either the land or the groove of the substrate, if information is recorded on the groove, then this system for recording information on the groove has many points common to the existing MD recording and reproducing system, which is then advantageous for realizing compatibility.

Further, as the light source of the optical system for use with the above-mentioned second optical recording medium, there can be used lasers with different wavelengths such as 680 nm, 660 nm and 410 nm instead of the laser diode with the wavelength of 780 nm. Since the laser with the wavelength of 780 nm has advantages in which its original laser output is large, it has small power consumption and it is inexpensive, when the light source with the wavelength of 780 nm is used, there is a large merit to increase a high recording density of the medium for consumers.

Also, it can easily be expected that these large-storage capacity information recording mediums will frequently be used to record moving pictures. When the wavelength of the light source is selected to be 780 nm, a margin for avoiding de-track and disc skew produced by vibrations produced when a moving picture is recorded increases more. The information recording medium is advantageous for protecting it from being smudged by dusts or the like when the wavelength of the light source is similarly selected to be 780 nm.

In actual practice, the light source with the wavelength of 780 nm cannot avoid fluctuations of wavelength of ±10 nm due to dispersions produced in the manufacturing process at ordinary accuracy. Similarly, the numerical aperture of the objective lens also cannot avoid fluctuations of approximately ±0.01. For this reason, the present invention uses the optical system with the wavelength of 780 nm±10 nm and the numerical aperture NA of the objective lens of 0.45±0.01.

Next, the above-mentioned second optical recording medium 20 was recorded and reproduced by the above-mentioned FAD system and its recording and reproducing characteristic was examined.

Figure 4:
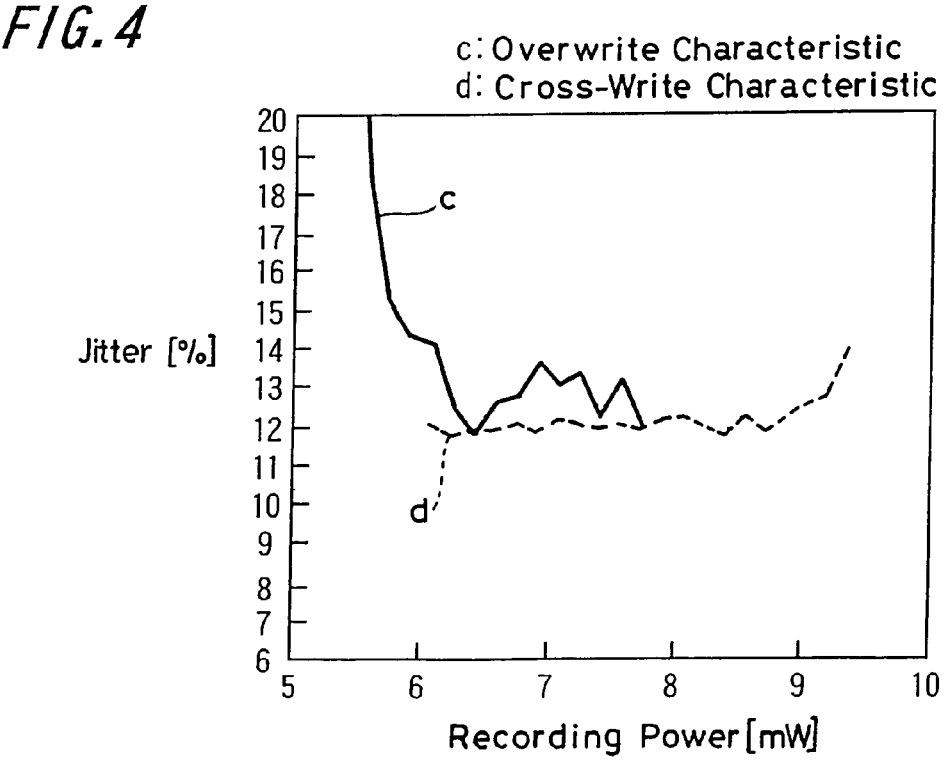
FIG. 4 is a diagram showing a recording characteristic of an example of an optical recording medium.
Figure 5:
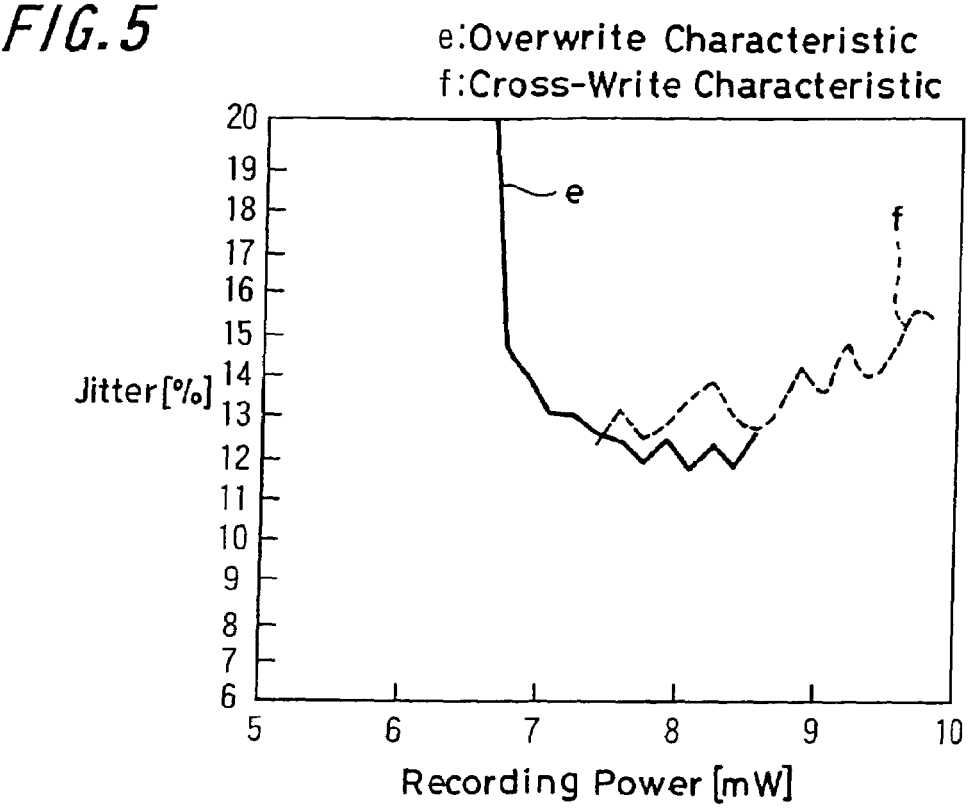
FIG. 5 is a diagram showing a recording characteristic of an example of an optical recording medium.

FIGS. 4 and 5 show recording and reproducing characteristics obtained when information is recorded on the grooves and the lands in the state in which the track pitch $Tp_2$ of the substrate 11 is selected to be 1.3 μm and the groove depth $d_2$ thereof was selected to be 170 nm, respectively. In the recording and reproducing characteristic, shown in FIG. 4, obtained when information is recorded on the groove and the recording and reproducing characteristic, shown in FIG. 5, obtained when information is recorded on the land, solid lines c and e show measured results of overwrite characteristics, that is, measured results of jitter characteristics obtained when information is recorded on the main track while the power of the laser is being increased. Broken lines d and f show measured results of cross-write characteristics, that is, measured results of jitters on the main track after information has been recorded on the adjacent track by that power. More specifically, those diagrams are graphs showing the measured results of the cross-write characteristics generated from the adjacent track to the main track. Measurement conditions are such that the linear velocity is 2.0 m/s, the shortest bit length being 0.16 μm as described above.

From the results shown in FIGS. 4 and 5, it is to be understood that both of the land and the groove have sufficient recording power margins.

Figure 6:
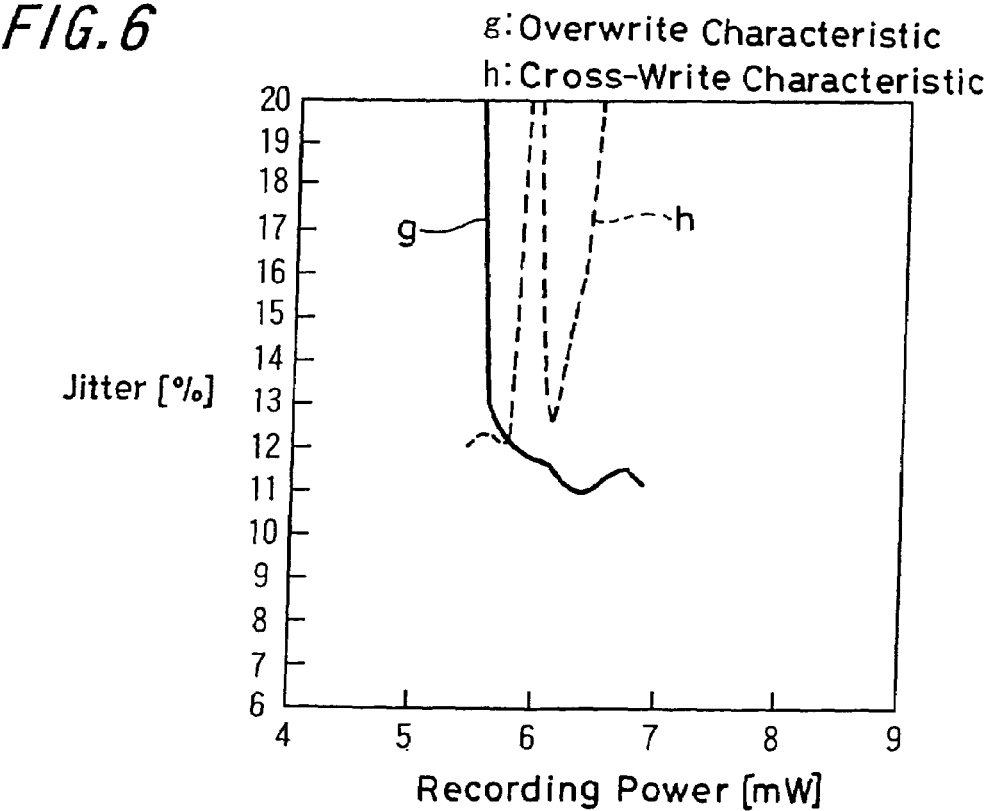
FIG. 6 is a diagram showing recording a recording characteristic of an example of an optical recording medium.
Figure 7:
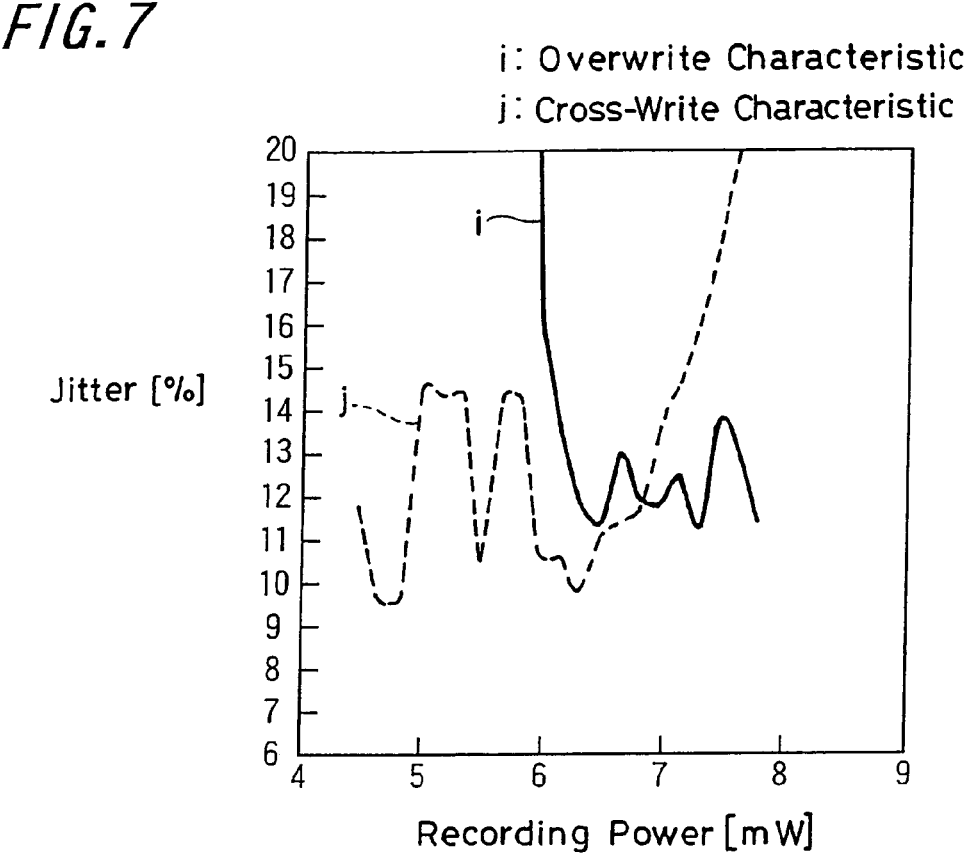
FIG. 7 is a diagram showing a recording characteristic of an example of an optical recording medium.

On the other hand, we have examined recording and reproducing characteristics obtained when the groove depth was selected to be 70 nm similarly to the first optical recording medium 10 while the track pitch $Tp_2$ was held small, that is, 1.3 μm. In FIGS. 6 and 7, solid lines g and I show measured results of overwrite characteristics and broken lines h and j show measured results of cross-write characteristics obtained after information has been recorded on the groove and the land, respectively. Measurement conditions were selected to be similar to those of the above-mentioned examples of FIGS. 4 and 5.

From the results shown in FIGS. 6 and 7, it is clear that when the groove depth $d_2$ of the second optical recording medium 20 is selected to be the same as the groove depth $d_1$ of the first optical recording medium 10, recording power to the main track and cross-write power from the adjacent track are very close to each other and the recording power margin is small. There is then a large possibility that the system will become unable to function due to some external disturbance. Alternatively, there is a possibility that information will be erased and hence there is a risk that the recording and reproducing characteristic cannot be held stably.

Accordingly, in the present invention, the groove depth $d_2$ of the second optical recording medium 20 of which recording capacity can be increased relatively is selected in a range of from 150 nm to 180 nm. More preferably, this groove depth should be selected in a range of from 160 nm to 175 nm, whereby the recording and reproducing characteristic can be made more stable.

Next, the material and arrangement of the second optical recording medium 20 which can be recorded and reproduced with super resolution by the D-RAD system recording and reproducing system will be described in which case the above-mentioned arrangement shown in FIGS. 1 and 2 is used and the first optical recording medium 10 has the same material and arrangement as those of the above-mentioned example.

In this example, similarly to the above-mentioned example, the second substrate is a disc-like substrate molded by an injection molding method of a resin material such as ZEONEX and polycarbonate. A refractive index of this second substrate is selected in a range of from 1.45 to 1.65, a thickness thereof is selected in a range of from 1.1 to 1.3 mm, and birefringence thereof is selected to be less than 30 nm.

In this example, a substrate 11 has a groove 12 with a track pitch $Tp_2$ of 1.2 μm and a groove depth $d_2$ of 175 nm.

This substrate is set to a carrying sputtering system in which films are to be deposited on the substrate under high vacuum condition of higher than $1\times10^{-4}$ Pa.

First, a SiN film, for example, is deposited as a first dielectric layer 13. This film is deposited from a Si target by a reactive sputtering method of a mixed gas of an Ar gas and an $N_2$ gas. A gas flow rate of the Ar gas and the $N_2$ gas is selected to be 40:20. A film thickness of this film is selected in a range in which a magneto-optical recording characteristic of super resolution can be prevented from being deteriorated, for example, in a range of from 76 nm to 88 nm, for example, 80 nm. Similarly to the above-mentioned example, this layer plays the role of not only optically enhancing the signal of the magneto-optical recording layer but also preventing moisture from the substrate from reaching the recording layer.

Next, a reproducing layer 14 is deposited as the first magneto-optical recording layer. A composition of this reproducing layer is $Gd_{24}Fe_{63}Co_{13}$ and a film thickness thereof is selected to be 40 nm. A sputtering gas is an Ar gas. So long as the film thickness lies in a range of from 35 nm to 48 nm, a magneto-optical recording characteristic can be prevented from being deteriorated. A film with a large Kerr rotation angle is used as the reproducing layer 14.

A second magneto-optical recording layer is deposited. While the intermediate switching layer 15 is shown as the second magneto-optical recording layer in the example of FIG. 2, in this case, the intermediate switching layer is made of a material which might be called an intermediate layer, for example, $Gd_{29}Fe_{60}Co_2Si_9$ and a film thickness thereof is selected to be approximately 30 nm. A sputtering gas is an Ar gas. So long as the film thickness of this intermediate switching layer is selected in a range of from 29 nm to 36 nm, a magneto-optical recording characteristic can be prevented from being deteriorated.

Next, a recording layer 16 is deposited as a third magneto-optical recording layer. A composition of this recording layer is $Tb_{22}Fe_{63}Co_{15}$ and a film thickness thereof is selected to be 46 nm, for example. So long as the film thickness of this recording layer is selected in a range of from about 42 nm to 60 nm, a magneto-optical recording characteristic can be prevented from being deteriorated.

Thereafter, a second dielectric layer 17 is deposited. A material and conditions for depositing this second dielectric layer can be selected to be the same as those of the first dielectric layer 13, and a film thickness thereof is selected to be 25 nm, for example.

Next, an AlTi film having a film thickness of 9 nm, for example, is deposited as a thermal diffusion layer 18. In the last process, a protective layer 19 made of an ultraviolet-curing resin, for example, having a film thickness ranging of from approximately 10 to 20 μm was deposited by a suitable method such as a spin-coating method and cured to construct the second optical recording medium 20.

The thus manufactured second optical recording medium 20 was recorded and reproduced by effectively utilizing super resolution reproduction based on the above-mentioned D-RAD system and a recording and reproducing characteristic thereof was examined.

More specifically, when recorded information is reproduced, in the state in which the reproducing layer 14 is magnetized in one direction, a reproducing magnetic field Hr is applied to the reproducing layer along its magnetization direction to produce a low temperature region, a reproducible region and a high temperature region in the region irradiated with an illumination spot, a sum of the reproducing magnetic field Hr and coercive force $H_{CA}$ of the reproducing layer 14 is decreased only in the reproducible region as compared with a magnetic field $H_{W1}$ of the magnetic wall between the reproducing layer and the intermediate layer adjoining the reproducing layer 1, that is, the second magneto-optical recording layer 15, the magnetization of the recording layer 16 is transferred to and detected in the reproducing layer 14 only in the reproducible region within the reproducible region and thereby super resolution reproduction is carried out.

In this example, the reproducing magnetic field Hr is 32 kA/m at room temperature, the coercive force $H_{CA}$ of the reproducing layer 14 is 16 kA/m at room temperature and the magnetic field $H_{W1}$ produced by the magnetic wall between the reproducing layer 14 and the second magneto-optical recording layer 15 is 24 kA/m at room temperature.

Further, in this example, the shortest recording bit length of recording information was selected to be 0.16 μm which is less than the bit length corresponding to the cut-off frequency of the modulation transmission function of the optical system, and the recording capacity is selected to be 1.0 GB.

Figure 8:
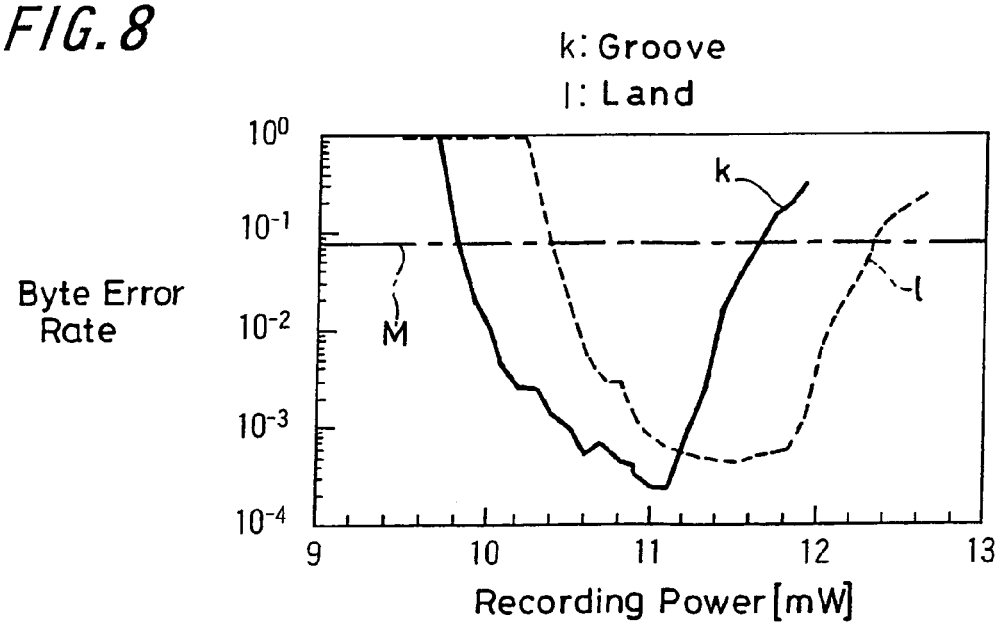
FIG. 8 is a diagram showing a recording characteristic of an example of an optical recording medium.

FIG. 8 shows byte error rates corresponding to recorded information on the groove 12 and the land 21 when recording power is changed. A solid line k shows recorded information on the groove 12 and a broken line l shows recorded information on the land, respectively. A dash-and-dot line M shows a margin level. From FIG. 8, it is to be understood that a sufficient recording power margin could be obtained.

Figure 9:
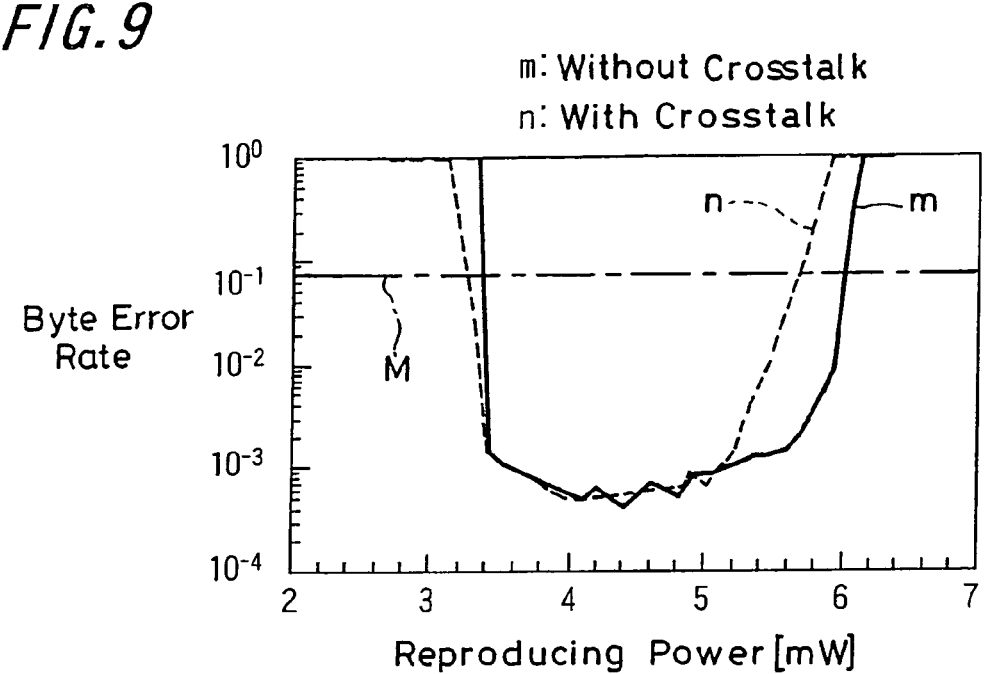
FIG. 9 is a diagram showing a reproducing characteristic of an example of an optical recording medium.
Figure 10:
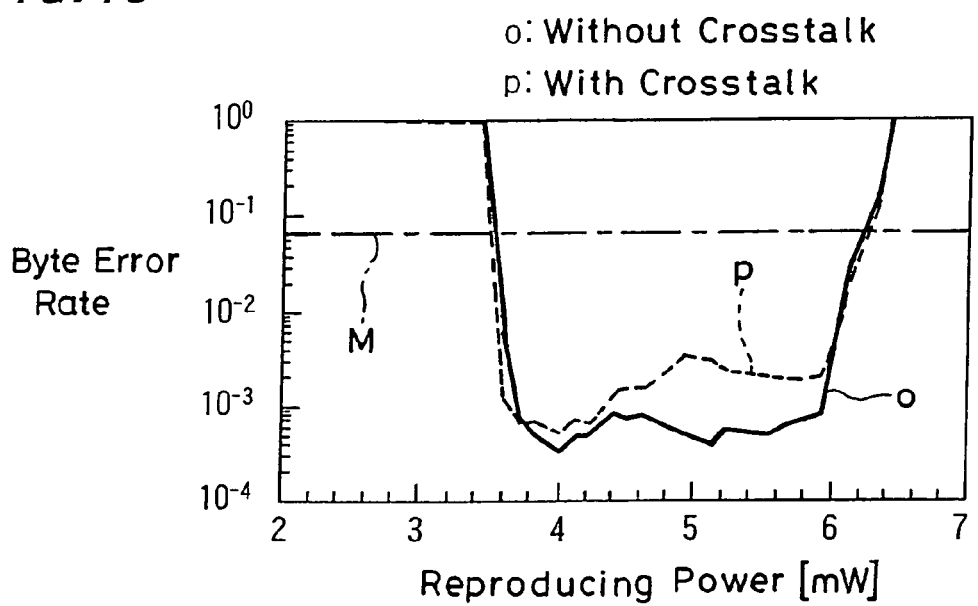
FIG. 10 is a diagram showing a reproducing characteristic of an example of an optical recording medium.

Next, FIGS. 9 and 10 show measured results of reproducing power margins. FIG. 9 shows measured results obtained when recorded information was reproduced from the groove. A solid line m shows measured results obtained when recorded information was reproduced from the groove with a crosstalk, and a broken line n shows measured results obtained when recorded information was reproduced from the groove without crosstalk. FIG. 10 shows measured results obtained when recorded information was reproduced from the land. A solid line o shows measured results obtained when recorded information was reproduced from the land with a crosstalk, and a broken line p shows measured results obtained when recorded information was reproduced from the land without crosstalk. In FIGS. 9 and 10, a dash-and-dot line M shows a reproducing power margin level. From these measured results, it is to be understood that the magnitude of the byte error rate is not so changed with or without crosstalk and that a wide reproducing power margin can be obtained.

Figure 11:
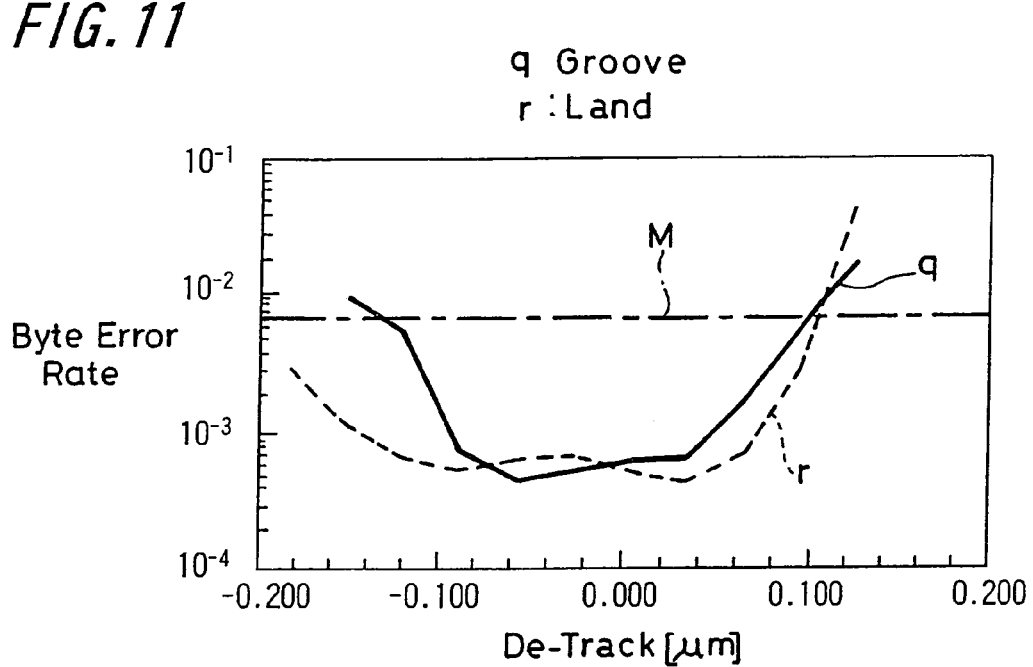
FIG. 11 is a diagram showing a reproducing characteristic of an example of an optical recording medium.
Figure 12:
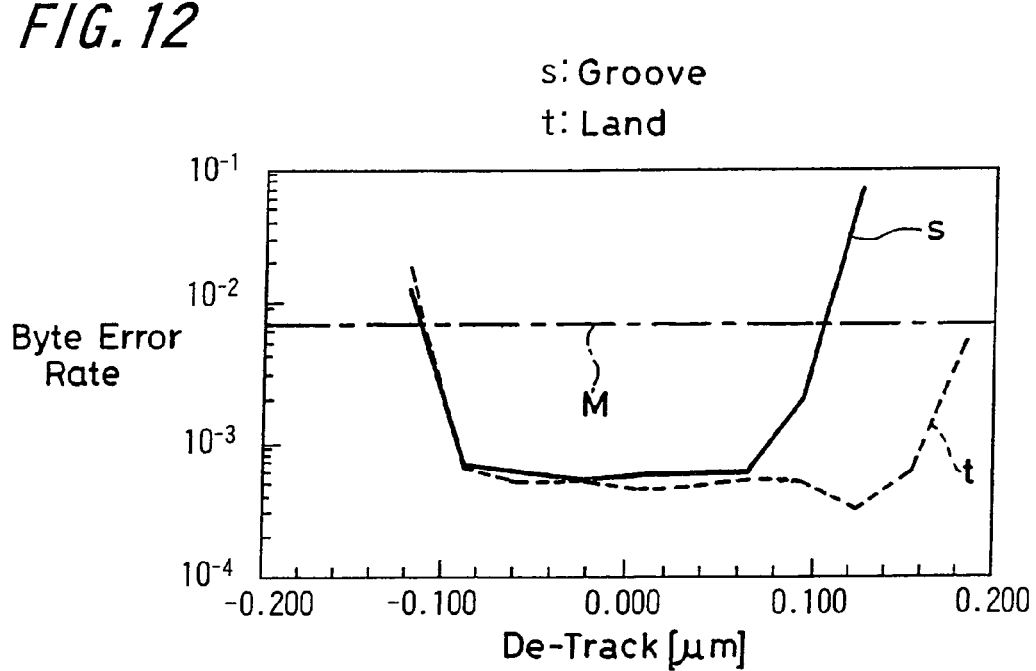
FIG. 12 is a diagram showing a reproducing characteristic of an example of an optical recording medium.

Next, FIGS. 11 and 12 show measured results of a de-track margin. FIG. 11 shows measured results of a de-track margin obtained when recorded information was reproduced from the groove and the land. A solid line q shows measured results of the de-track margin obtained when recorded information was reproduced from the groove, and a broken line r shows measured results of the de-track margin when recorded information was reproduced from the land. FIG. 12 shows measured results of the de-track margin obtained when information was recorded on the groove and the land. A solid line s shows measured results of the de-track margin obtained when information was recorded on the groove, and a broken line t shows measured results of the de-track margin obtained when information was recorded on the land. A dash-and-dot line M shows the de-track margin level. From these measured results, it is to be understood that the sufficient de-track margins could be obtained in any of the above cases.

While the present invention uses the second optical recording medium 20 which is recorded and reproduced by the FAD system and D-RAD system of MSR in the above-mentioned examples, the present invention is not limited to those examples, and the present invention can obtain a stable recording and reproducing characteristic even when the present invention is applied to other system in which a magnetic domain is transferred and thereby enlarged and other system in which a magnetic wall is displaced.

In particular, the present invention uses magnetic wall displacement and domain enlargement type MSR systems, these systems have characteristics from a recording and reproducing standpoint in which a reproducing magnetic field required when these systems function is not required. Thus, if these systems are applied to the present invention, then when compatibility with the MD is obtained, the apparatus can be simplified more in arrangement, accordingly, the apparatus can be made compact in size and light in weigh and further a cost of the apparatus can be decreased.

As set forth above, according to the present invention, since it becomes possible to use the MD that is now widely used, recorded information can be used significantly and a large-storage capacity optical recording medium with a high recording density necessary for recording and reproducing moving picture information whose demand will increase more can be used by an apparatus having the same optical system. At the same time, its recording and reproducing characteristic can be held stably, and hence it is possible to provide an optical recording and reproducing method and an optical recording medium which are extremely advantageous for practical use.

The invention claimed is:

1. An optical recording and reproducing method for recording and reproducing data from at least two types of optical recording media comprising:
   generating recording and/or reproducing light with a wavelength selected in a range of 780 nm±10 nm and transmitting the light via an objective lens with a numerical aperture NA selected in a range of from 0.45±0.01;
   reproducing data from first and second optical recording mediums with different recording capacities, said first optical recording medium having a track pitch in a range of from 1.5 μm to 1.7 μm and a groove depth in a range of from 70 nm to 90 nm, and said second optical recording medium having a track pitch in a range of from 1.2 μm to 1.3 μm and a groove depth in a range of from 150 nm to 180 nm.

2. The optical recording and reproducing method according to claim 1, wherein said first and second optical recording mediums are magneto-optical recording mediums.

3. The optical recording and reproducing method according to claim 2, wherein said first optical recording medium has at least a first dielectric layer, a magneto-optical recording layer, a second dielectric layer and a thermal diffusion layer deposited over a substrate, in that order, and
   said second optical recording medium has at least a first dielectric layer, a first magneto-optical recording layer, a second magneto-optical recording layer, a third magneto-optical recording layer and a second dielectric layer deposited over a substrate, in that order, and said second magneto-optical recording layer having a Curie temperature selected to be small as compared with Curie temperatures of said first and third magneto-optical recording layers.

4. The optical recording and reproducing method according to claim 3, wherein said magneto-optical recording layer of said first optical recording medium is comprised of either TbFeCo or TbFeCoCr, and said first magneto-optical recording layer of said second optical recording medium is comprised of any one of GdFeCo, GdFe, GdFeCoCr, GdFeCoAl or GdFeCoSi, said magneto-optical recording layer of said second optical recording medium is comprised of any one of TbFe, TbFeCo, TbFeAl, TbFeCr, TbFeSi, TbFeCoAl, TbFeCoCr or TbFeCoSi, and said third magneto-optical recording layer of said second optical recording medium is comprised of either TbFeCo or TbFeCoCr.

5. The optical recording and reproducing method according to claim 1, wherein said second optical recording medium is a magneto-optical recording medium containing information which is reproduced by a magnetically induced super resolution (MSR) system, said second optical recording medium having a recording capacity greater than 1 GB.

6. The optical recording and reproducing method according to claim 5, wherein said second optical recording medium is a magneto-optical recording medium in which information is recorded by a groove recording system.

7. The optical recording and reproducing method according to claim 5, wherein said second optical recording medium is a magneto-optical recording medium in which information is recorded by a land-groove recording system.

8. An optical recording and reproducing method for recording and reproducing data comprising:

generating recording and/or reproducing light with a wavelength selected in a range of 780 nm±10 nm and transmitting the light via an objective lens with a numerical aperture NA selected in a range of from 0.45±0.01; and reading data from an optical recording medium with the light, characterized in that the optical recording medium has a track pitch in a range of from 1.2 μm to 1.3 μm and a groove depth in a range of from 150 nm to 180 nm.

9. The optical recording and reproducing method according to claim 8, wherein said optical recording medium is a magneto-optical recording medium.

10. The optical recording and reproducing method according to claim 9, wherein said magneto-optical recording medium has at least a first dielectric layer, a first magneto-optical recording layer, a second magneto-optical recording layer, a third magneto-optical recording layer and a second dielectric layer, in that order, and said second magneto-optical recording layer having a Curie temperature selected to be small as compared with those of said first and third magneto-optical recording layers.

11. The optical recording and reproducing method according to claim 10, wherein said first magneto-optical recording layer of said optical recording medium is comprised of any one of GdFeCo, GdFe, GdFeCoCr, GdFeCoAl or GdFeCoSi, said second magneto-optical recording layer of said optical recording medium is comprised of anyone of TbFe, TbFeCo, TbFeAl, TbFeCr, TbFeSi, TbFeCoAl, TbFeCoCr or TbFeCoSi, and said third magneto-optical recording medium of said optical recording medium is comprised of either TbFeCo or TbFeCoCr.

12. The optical recording and reproducing method according to claim 8, wherein said optical recording medium is a magneto-optical recording medium containing information reproduced by a magnetically induced super resolution system, and said magneto-optical recording medium having a recording capacity greater than 1 GB.

13. The optical recording and reproducing method according to claim 12, wherein said optical recording medium is a magneto-optical recording medium in which information is recorded by a groove recording system.

14. The optical recording and reproducing method according to claim 12, wherein said optical recording medium is a magneto-optical recording medium in which information is recorded by a land-groove recording system.

* * * * *